United States Patent [19]

Hirsch et al.

[11] Patent Number: 4,540,432
[45] Date of Patent: Sep. 10, 1985

[54] CONTINUOUS PROCESS OF MELTING SPONGE IRON

[75] Inventors: Martin Hirsch, Friedrichsdorf; Peter Fischer, Bad Vilbel-Dortelweil; Harry Serbent, Hanau am Main, all of Fed. Rep. of Germany

[73] Assignee: Metallgesellschaft Aktiengesellschaft, Frankfurt, Fed. Rep. of Germany

[21] Appl. No.: 577,952

[22] Filed: Feb. 8, 1984

[30] Foreign Application Priority Data

Feb. 10, 1983 [DE] Fed. Rep. of Germany ....... 3304504

[51] Int. Cl.³ .............................................. C21B 11/08
[52] U.S. Cl. ............................................ 75/43; 75/38
[58] Field of Search ...................... 75/38, 43, 40, 44 R

[56] References Cited

U.S. PATENT DOCUMENTS 3,165,398 1/1965 Shimamura et al. .................. 75/40
4,008,074 2/1977 Rossner et al. ......................... 75/43

Primary Examiner—Melvyn J. Andrews
Attorney, Agent, or Firm—Sprung, Horn, Kramer & Woods

[57] ABSTRACT

The melting operation is carried out in an elongated horizontal reactor, in which sponge iron is charged onto the molten material in an intermediate region of the reactor, carbonaceous fuel and high-oxygen gases are blown into the molten material and slag and sponge iron are tapped at opposite ends of the reactor. To permit an economical melting of sponge iron having a large particle size range with the aid of virtually only solid carbonaceous fuels, the sponge iron is charged into the reactor in an intermediate region of 20 to 40% of the total length of the reactor, fine-grained carbonaceous fuel and high-oxygen gas are blown into the molten material from below in that region, the rates of oxygen and carbon are so controlled that a molten iron containing 1 to 3% carbon is produced, the remaining carbon contained in the molten material is reacted in the melt to produce CO, and the remaining energy required in the process is produced in that the CO and hydrogen are virtually completely burnt above the molten material as a result of a supply of oxygen-containing gases into the free space of the reactor.

16 Claims, 2 Drawing Figures

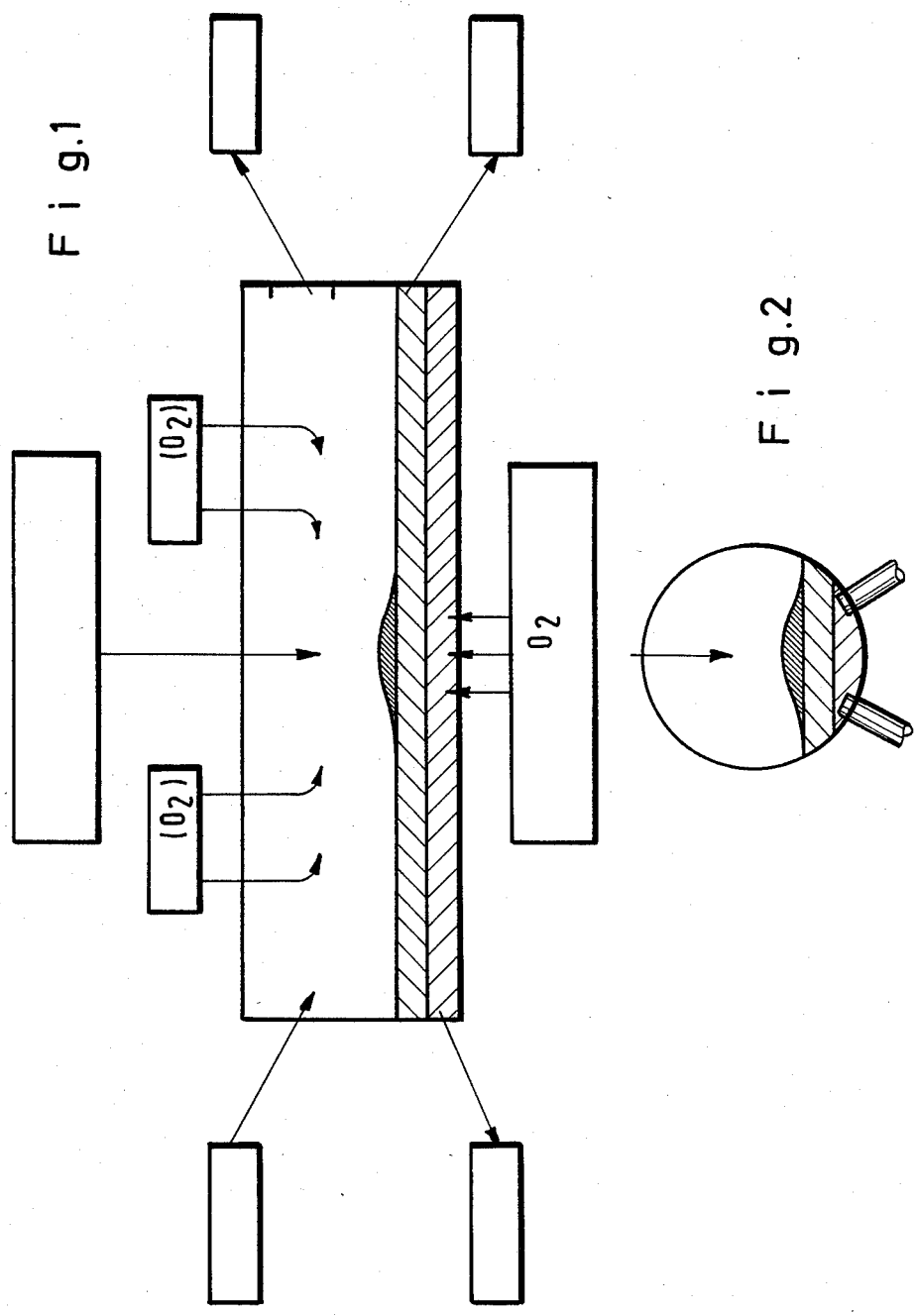

CONTINUOUS PROCESS OF MELTING SPONGE IRON

BACKGROUND OF THE INVENTION

1. Field of the Invention

This invention relates to a continuous process of melting sponge iron in an elongated horizontal reactor, wherein sponge iron is charged onto the molten material in an intermediate region of the reactor, carbonacous fuel and high-oxygen gases are blown into the molten material, and slag and molten iron are tapped at opposite ends of the reactor.

2. Discussion of the Prior Art

The so-called direct reduction processes normally result in a product described as "sponge iron". It is produced from iron ore, from which only the combined oxygen of iron oxide is substantially removed with the aid of suitable reducing agents whereas the iron ore remains in solid state and its external shape is preserved.

The sponge iron produced from ores which have a sufficiently high iron content can be used directly as a substitute for scrap in the conventional steep production. In some cases, particularly if the sponge iron is fine-grained and must be transported and stored for a long time, the sponge iron is briquetted immediately after its production.

The electric arc furnace has proved to be particularly suitable for the processing of sponge iron to produce steel and is being used for that purpose throughout the world. But the electrical energy required for that purpose is expensive and often can be produced only with relatively high conversion losses. In addition, electrical energy is not available everywhere under acceptable conditions and in adequate quantities. For this reason a melting process in which primary energy source could be used directly would have considerable advantages.

A further disadvantage resides in the fact that the operation is discontinuous. This involves a higher consumption of energy and fluctuations of the rate and composition of the exhaust gas which is formed and which can be used for other purposes.

It has been proposed to melt sponge iron in a continuous operation in an elongated horizontal reactor (Journal of Metals, June 1969, pages 50 to 56). In that operation, the sponge iron is charged onto the molten material in an intermediate region. The intermediate region of the reactor is circular and preferably consists of an electric arc furnace because in that case the supply of heat and the required agitation of the molten material by inductive agitation can be controlled independently of one another, different from the use of burners. The carbon is preferably charged into the reactor as the surplus carbon which has been incorporated in the prereduced pellets. Alternatively, carbon may be separately blown into the melting zone. The circular melting zone is adjoined on one side by the refining zone and on the other side by the slag-purifying zone. In the refining zone, oxygen is blown on the molten material through lances. The exhaust gas from the reactor is reducing and for this reason is fed to the direct reduction unit for a utilization of its chemical reducing potential.

It is known from German No. 24 01 909 to blow fine-grained sponge iron, oxygen and fine-grained coal from below into molten material in a crucible-shape reactor in a continuous operation. The exhaust gas consists almost entirely of CO and after a collection of dust is used in part as reducing gas for a direct reduction in a fluidized bed, another part is recirculated to the reactor as a carrier gas for entraining the sponge iron and the coal, and a further part is afterburnt after a dust collection and used as a heat exchange fluid. That process can be used only to process fine-grained sponge iron and is combined with a direct reduction in a fluidized bed.

In a similar procedure known also from German No. 24 01 540, fine-grained sponge iron is blown into the molten material from below and sponge iron in the form of lumps or pellets is charged onto the surface of the molten material in the crucible-shaped reactor.

In both cases a recycling of the exhaust gas consisting almost entirely of CO into the molten material is required. That gas cannot be expected to have a reducing activity and it can be used substantially only as a carrier gas for entraining the coal and the fine-grained sponge iron, as a gas for protecting the blowing nozzles, and as a fluid for agitating the molten material. A disadvantage of that practice resides in that the gas must be purified, cooled and compressed before it is re-used. The cooled gas which has been recycled must be reheated by the molten material so that heat is extracted from the process.

It is an object of the invention to avoid the disadvantages of the known processes and particularly to permit a continuous melting of sponge iron having a large particle size range in an economical manner and with the aid of virtually only solid carbonaceous fuels.

SUMMARY OF THE INVENTION

This object is accomplished in accordance with the invention in that the sponge iron is charged into the reactor in an intermediate region of 20 to 40% of the total length of the reactor, fine-grained carbonaceous fuel and high-oxygen gas are blown into the molten material from below in that region, the rates of oxygen and carbon are so controlled that a molten iron containing 1 to 3% carbon is produced, the remaining carbon contained in the molten material is reacted in the melt to produce CO, and the remaining energy required in the process is produced in that the CO and hydrogen are virtually completely burnt above the molten material as a result of a supply of oxygen-containing gases into the free space of the reactor.

"The intermediate region" of the reactor into which the sponge iron is charged need not be disposed exactly symmetrically at the center of the reactor and be equally spaced from the two ends of the reactor but may be toward nearer to one end than to the other. If the intermediate region is not equally spaced from the two ends of the reactor, then it is preferably nearer to the discharge end for the molten metal but does not extend into the first 20% of the reactor length seen from the discharge end for the molten metal.

The reactor is suitably cylindrical and adapted to be rotated about its longitudinal axis. As a result, the nozzles provided at the bottom can be moved out of the molten material for repairs and down times. That shape is also desirable for the refractory lining. The coarse-grained sponge iron is charged onto the molten material from above. The high-oxygen gases which are blown into the reactor consist of commercially pure oxygen or of highly oxygen-enriched air. The oxygen and the fine-grained coal are blown into the reactor through nozzles. Gases are used as an entraining fluid for blowing the fine-grained coal. Hydrocarbons, such as methane, are blown into the reactor in order to prevent a burning of the mouthpieces of the nozzles in that said mouthpieces are cooled as a result of the decomposition of said hydrocarbons. For that purpose the nozzles consist usually of double-tube nozzles.

The reaction of the solid carbonaceous fuel and of the carbon derived from the hydrocarbons with the oxygen which has been injected results in a production of CO in the molten material. That CO from the molten material as well as hydrogen derived from the hydrocarbons and from the solid fuel enter the free space of the reactor and in said free space are burnt to a large extent to produce $CO_2$ and $H_2O$ in the presence of oxygen-containing gases which are introduced and which may consist of air or high-oxygen gases. The energy required in the process is supplied by the reaction of the carbon in the molten material to form CO and by the combustion of CO and hydrogen in the free reactor space.

The rate at which solid fuel is blown into the reactor is so selected that the carbon content of the fuel—after the subtraction of the quantity required to carburize the molten iron to a carbon content of 1 to 3%—is sufficient for a supply of the required energy by a reaction to form CO and a combustion to form $CO_2$. The energy which is produced by the combustion of hydrogen from the solid fuel and from the hydrocarbons and by the combustion of the carbon from the hydrocarbons must be taken into account. The rate at which oxygen is supplied is so controlled that the solid carbon—except for the carbon required to carburize the molten iron—is reacted in the molten material to form CO.

The exhaust gas is withdrawn from the reactor at that end at which the slag is tapped. The heat content of the exhaust gas can well be utilized for other purposes, such as drying or energy production. Any admixture which may be required, such as desulfurizing agents, are also charged into the intermediate region.

All kinds of coal can be used, in principle, in the process according to the invention, provided that the coal is dried to a moisture content below 3% and is reduced in size substantially below 1 mm. It is preferred to use coals having low contents of ash and volatile constituents.

According to a preferred further feature, the sponge iron is charged into the reactor in an intermediate region of 20 to 25% of the total length of the reactor. Particularly good results will be obtained in that way.

According to a further preferred feature, fine-grained sponge iron having a particle size up to 3 mm is blown into the molten material from below in the intermediate region of the reactor. That practice results in a melting of fine-grained sponge iron under favorable conditions and in a small sponge iron content of the exhaust gas. The fine-grained sponge iron is injected together with an entraining gas which contains as little oxygen as possible. Coal may be admixed to the sponge iron.

According to a further preferred feature, coal is charged onto the molten material together with the sponge iron. This permits an additional control of the carbon balance of the process.

According to a further feature, oxygen is blown onto or into the molten material in order to reduce its carbon content before the molten material is tapped. In that manner the carburized hot metal which has been produced in the reactor can be processed to produce steel in the same reactor.

BRIEF DESCRIPTION OF DRAWING

The process according to the invention is diagrammatically illustrated in the drawings.

FIG. 1 is a longitudinal sectional view showing the reactor.

FIG. 2 is a transverse sectional view showing the reactor.

The advantages afforded by the invention reside in that sponge iron having a large size range from fine-grained to coarse-grained can be continuously melted in an economical manner with a virtually exclusive and direct use of coal as primary energy. The primary energy is utilized in a very high degree.

EXAMPLE

The elongated horizontal reactor has a length of 20 meters and a diameter of 3 meters (outside) and is lined with basic refractory bricks. It is equipped with 5 submerged natural gas-shielded injectors for coal and oxygen. The injectors are arranged along the bottom center line of the reactor with a distance of about 1 meter between each other in the intermediate region. The intermediate region begins about 5.5 meters from the metal discharge end and ends about 10.5 meters from the metal discharge end. The reactor contains a molten bath of about 1 meter depth, consisting of pig iron and basic slag. Coarser sponge iron is fed at two feed points through the roof onto the bath in the intermediate region. Finer sponge iron is injected into the bath from the bottom into this region.

6.76 metric tons per hour of sponge iron are charged into the reactor. The sponge iron has the following composition:

|  |  |
| --- | --- |
| metallization | 90% |
| metallic iron | 77.6% |
| FeO | 11.1% |
| C | 2.0% |
| gangue | 9.3%. |

80% of the sponge iron has a particle size over 1 mm and 20% below 1 mm. The fraction over 1 mm is fed onto the bath and the fraction below 1 mm is injected into the bath.

1.16 metric tons per hour of coal are injected into the bath. The coal has a grain size below 1 mm, 2% of water content and the following composition:

|  |  |
| --- | --- |
| fixed carbon | 67% |
| ash | 15% |
| volatiles | 15%. |

1790 standard cubic meters per hour of technical oxygen (95% oxygen) are introduced into the reactor. 859.2 standard cubic meters are injected from the bottom into the bath and 930.8 standard cubic meters are introduced into the atmosphere in the free space of the reactor through water-cooled lances.

740 kg per hour of CaO in form of pulver are injected together with the coal and sponge iron from the bottom into the bath.

The temperature of the pig iron is about 1450° C.

The slag has a ratio of CaO to $SiO_2$ of 1.34 and an iron content of about 1.8%. 1725 kg per hour of slag are tapped at the slag discharge end of the converter.

5980 kg per hour of pig iron with a content of about 2% C are tapped at the opposite metal discharge end of the converter.

2450 standard cubic meters per hour of waste gas at a temperature of 1650° C. and with a content of CO and $H_2$ below 3% are discharged at the slag tapping end of the converter.

What is claimed is:

1. A continuous process of melting sponge iron which comprises introducing sponge iron into an elongated horizontal reactor in an intermediate region thereof comprising 20 to 40% of the total length of said reactor and depositing said sponge iron onto molten material contained in said horizontal reactor, introducing fine grain solid containing carbonaceous fuel hydrocarbons and a high-oxygen containing gas into said reactor by blowing the same into said molten material from below in said intermediate region, the amount of oxygen and carbon being so controlled such that the resultant molten iron contains 1 to 3% by weight carbon, converting substantially all of the remaining solid carbonaceous fuel containing hydrocarbon to carbon monoxide and hydrogen, introducing an oxygen containing gas into the free space above said molten material and in said free space burning said carbon monoxide and hydrogen whereby to supply energy to said process and removing slag and molten iron at opposite ends of said horizontal reactor.

2. A process according to claim 1, further comprising charging said sponge iron into an intermediate region of 20 to 25% of the total length of said reactor.

3. A process according to claim 1, further comprising blowing fine grain sponge iron having a particle size of up to 3 mm into said molten material from below in said intermediate region.

4. A process according to claim 1, further comprising charging coal onto said molten material together with said sponge iron.

5. A process according to claim 1, further comprising blowing oxygen onto said molten iron to reduce its carbon content before tapping said molten iron.

6. A process according to claim 1, further comprising blowing oxygen into said molten iron to reduce its carbon content before tapping said molten iron.

7. A process according to claim 1, further comprising producing the total heat necessary for melting said sponge iron (a) by converting carbon to carbon monoxide in said reactor and (b) by virtually completely combusting the CO produced and hydrogen in the free gas space above said molten material, the rates of oxygen and carbon blown into said melt being so that the iron melt has 1 to 3 percent by weight carbon content.

8. A process according to claim 1, further comprising introducing said hydrocarbon into said reactor as a shield from a double tube nozzle whereby said hydrocarbon prevents a burning of the mouthpiece of said nozzle.

9. A process according to claim 1, wherein said hydrocarbon is methane.

10. A process according to claim 1, wherein said horizontal reactor is cylindrical and adapted to be rotated about its longitudinal axis for repairs.

11. A process according to claim 3, wherein said sponge iron which is charged onto said molten material in said intermediate region has a particle size greater than said fine grain sponge iron which is blown into said molten material in said intermediate region from below.

12. A process according to claim 4, wherein said coal has a moisture content below 3% and a particle size below 1 mm.

13. A process according to claim 1, further comprising withdrawing exhaust gas from the reactor at the end at which the slag is removed.

14. A process according to claim 13, further comprising thereafter employing said exhaust gas for energy production.

15. A process according to claim 13, further comprising employing said exhaust gas to dry a material.

16. A process according to claim 15, further comprising employing said exhaust gas to dry coal down to a moisture content below 3% and thereafter charging said coal onto said molten material in said intermediate zone together with said sponge iron.

* * * * *

UNITED STATES PATENT AND TRADEMARK OFFICE
CERTIFICATE OF CORRECTION

PATENT NO. : 4,540,432
DATED : September 10, 1985
INVENTOR(S) : Martin Hirsch, Peter Fischer and Harry Serbent It is certified that error appears in the above-identified patent and that said Letters Patent is hereby corrected as shown below:

Substitute the attached sheet of drawing for that in the patent.

Col. 5, line 16, delete "containing";
      same line, after "fuel" insert -- containing --.

Signed and Sealed this

Ninth Day of January, 1990

Attest:

JEFFREY M. SAMUELS

Attesting Officer      Acting Commissioner of Patents and Trademarks

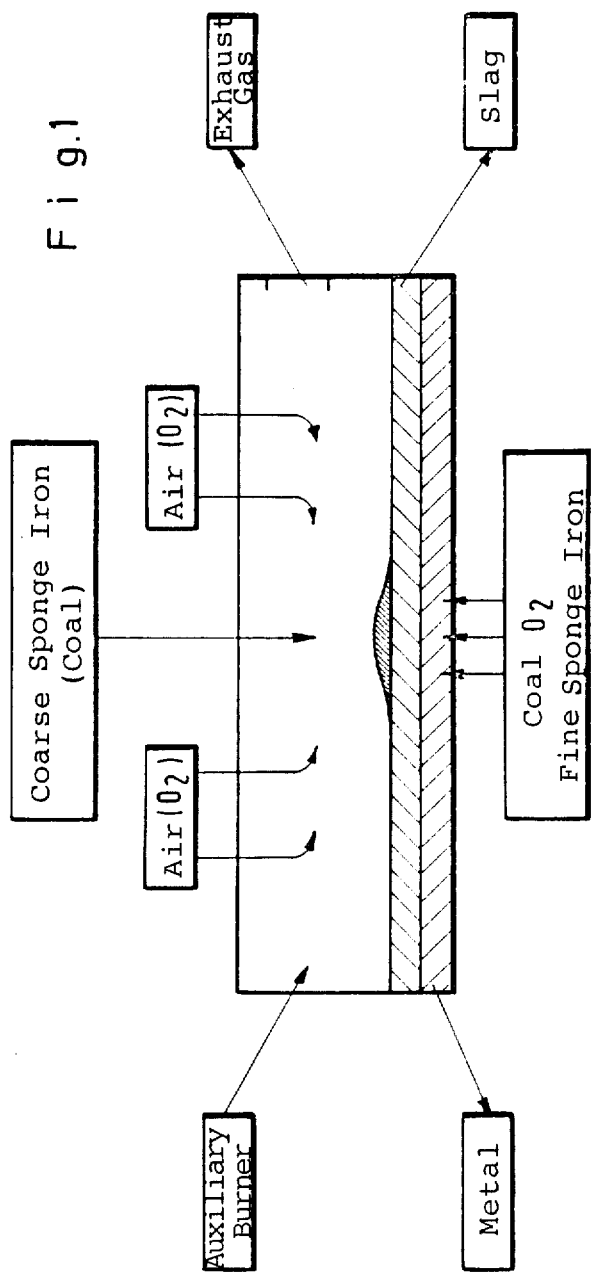
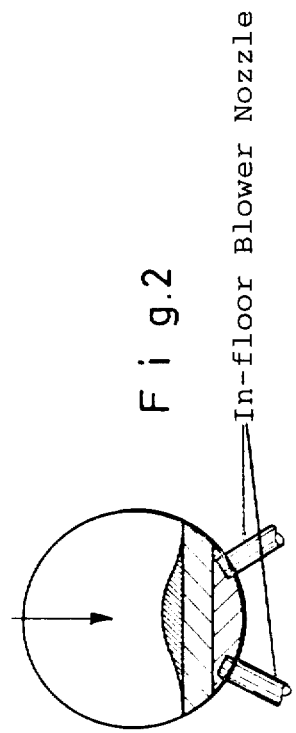
Fig.1
Fig.2